May 4, 1965  G. E. OSTERSTROM  3,181,359

FLOW RATE TRANSMITTER

Filed May 18, 1961  5 Sheets-Sheet 1

GORDON E. OSTERSTROM
INVENTOR

BY Richard G. Stephens

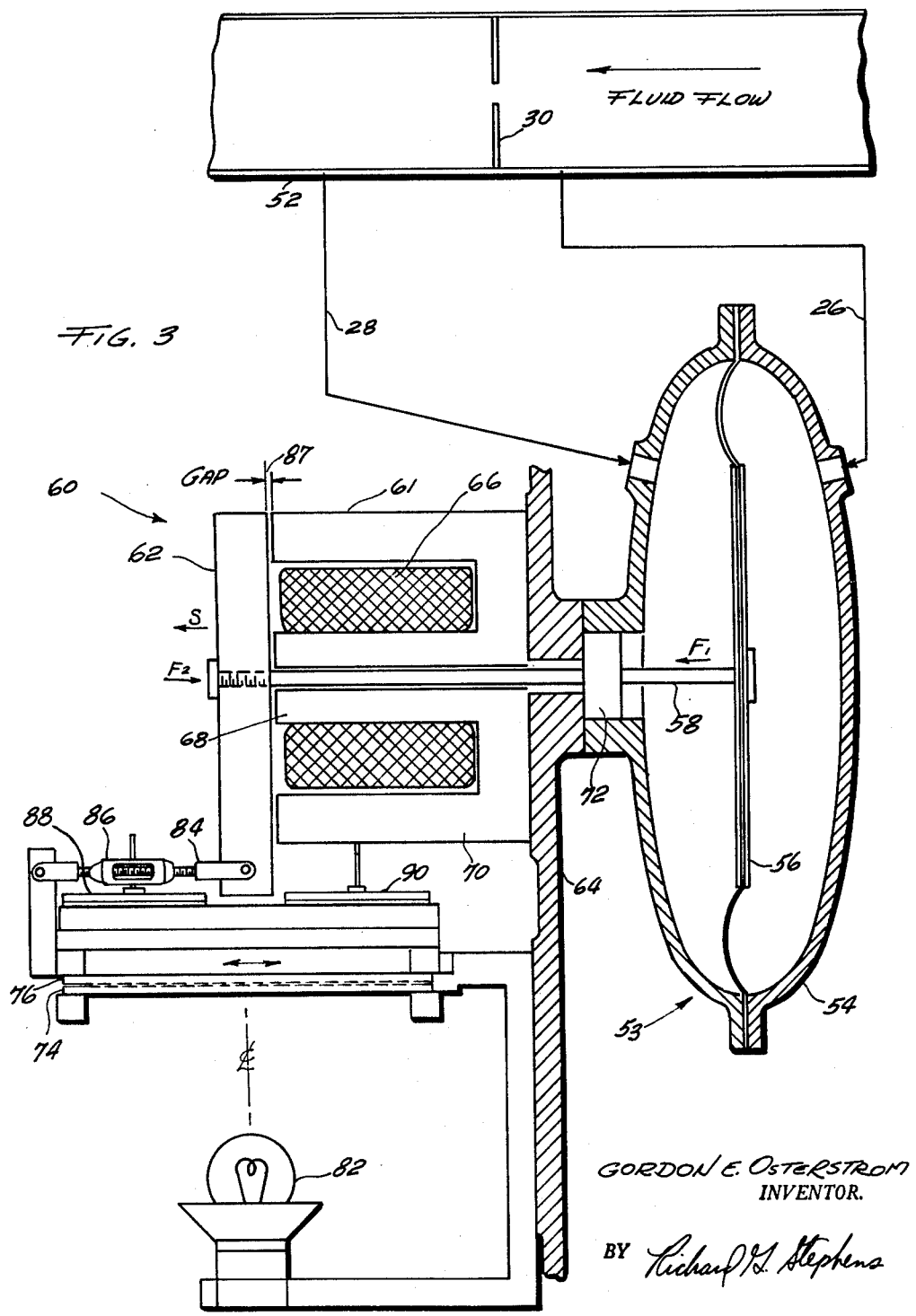

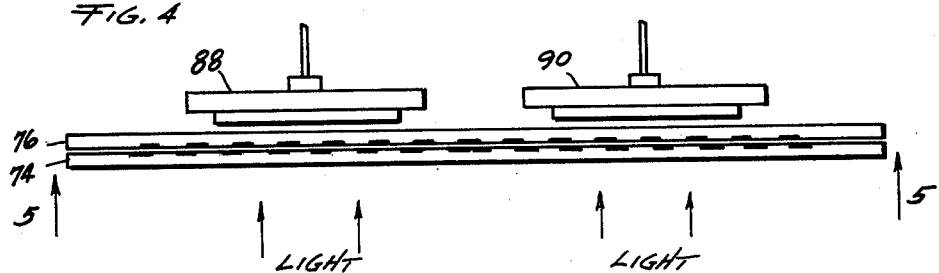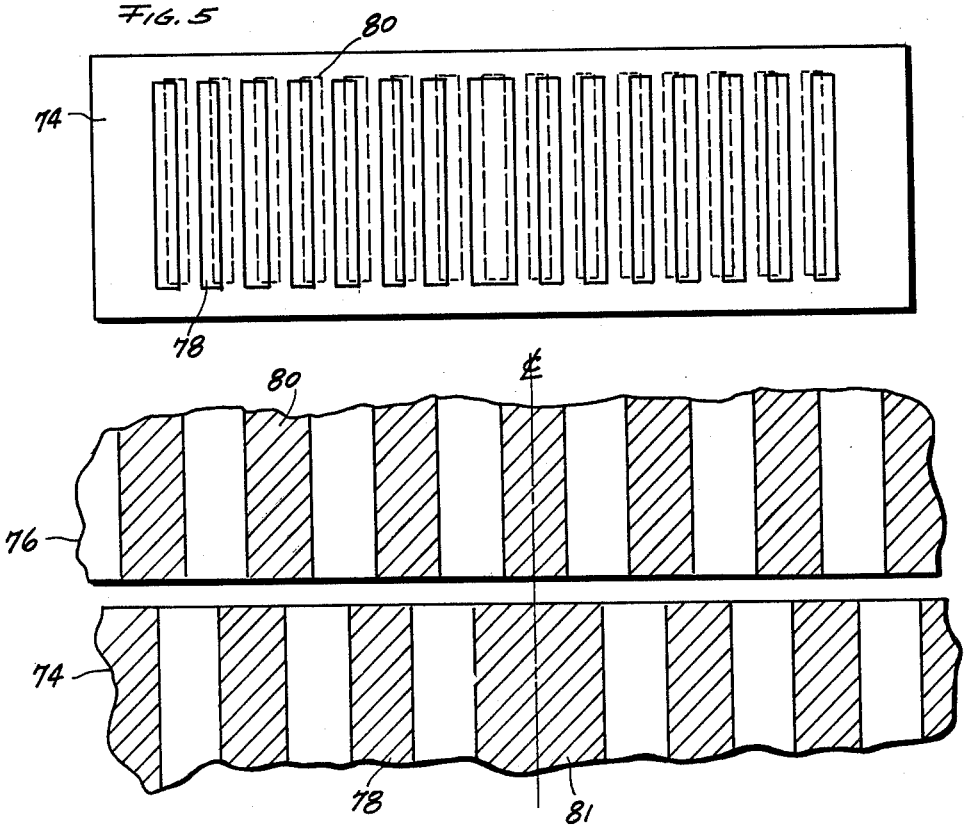

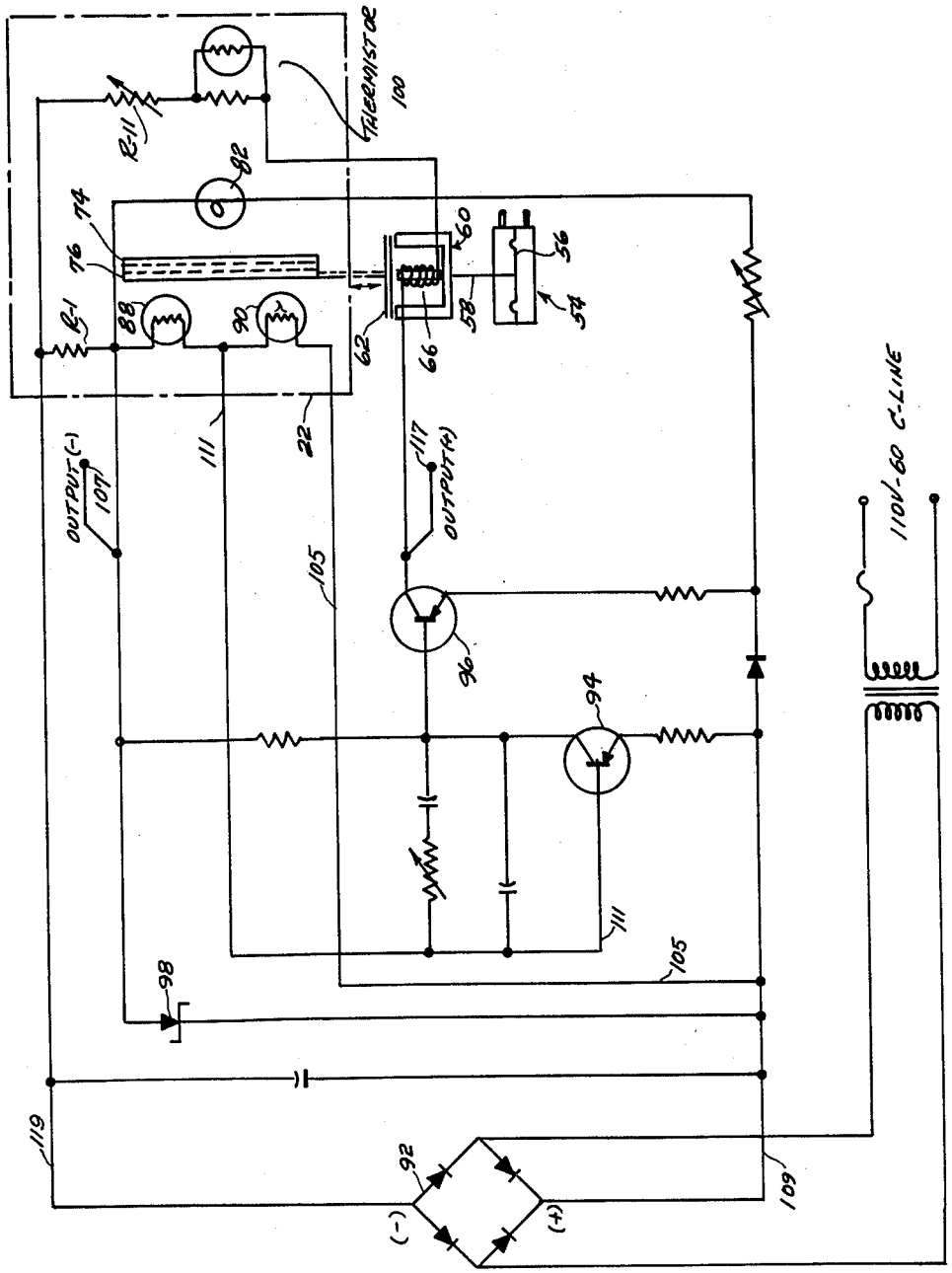

May 4, 1965 G. E. OSTERSTROM 3,181,359
FLOW RATE TRANSMITTER
Filed May 18, 1961 5 Sheets-Sheet 5

GORDON E. OSTERSTROM
INVENTOR
BY

United States Patent Office 3,181,359
Patented May 4, 1965

3,181,359
FLOW RATE TRANSMITTER
Gordon E. Osterstrom, Winnetka, Ill., assignor to GPE Controls, Inc., Chicago, Ill., a corporation of Illinois
Filed May 18, 1961, Ser. No. 110,984
1 Claim. (Cl. 73—211)

This invention relates to a transducer for use in control systems for providing an electrical signal which is proportional to the square root of an applied quantity, such as an applied differential pressure. Various types of prior devices have been proposed for providing an electrical signal proportional to the square root of a pressure differential for use in automatic control systems. Most of such prior devices have been complex and expensive, and capable of accurate operation only over limited ranges.

The transducer of the present invention is less complex, economical and compact, and it displays superior operating characteristics; being relatively insensitive to drift. More particularly, the transducer of the invention includes an economical electric force motor which develops more force per unit of power input than most prior art devices. A very simple arrangement is provided whereby the force factor of the motor may be easily adjusted, and the motor is provided with an advantageous uni-directional characteristic. In addition, a motion transducer is provided which is adapted to convert very small movements to proportional electric signals. The particular system arrangement shown advantageously utilizes the characteristics of the motion transducer to minimize the effects of amplifier drift.

The principal object of this invention is to provide an improved instrument for obtaining electrical signals proportional to the square root of an input quantity, such as a differential pressure. Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claim.

For a fuller understanding of the nature and objects of the invention reference should be had to the following detailed description taken in connection with the accompanying drawings, in which:

FIG. 3 is a view partially in section, showing in detail a practical embodiment of the invention;

FIG. 4 is a plan view of an improved motion transducer usable in the arrangement shown in FIGS. 1 and 3;

FIG. 5 is a view generally as seen from line 5—5 in FIG. 4;

FIG. 6 is an enlarged view illustrating the relative arrangement between two light control grating panels used in the motion transducer of FIG. 4;

FIG. 7 is an electronic circuit diagram of the invention;

Figure 1:
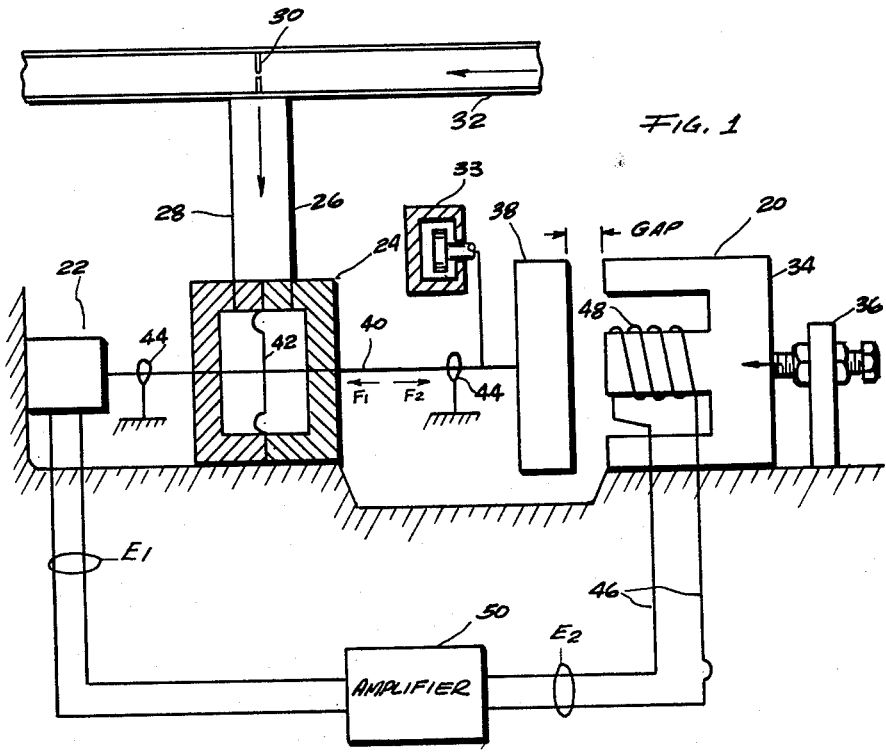
FIG. 1 is a schematic illustration of one embodiment of the invention.

Referring now to the schematic showing in FIG. 1, the invention is illustrated as including differential pressure sensing means 24, a displacement-to-electrical signal transducer 22, an electrical signal amplifier 50, and force motor means 20. As is well known to those skilled in the art, the fluid flow rate through conduit 32 will vary in accordance with the square root of the differential pressure drop across orifice plate 30. The pressures on the upstream and downstream sides of orifice 30 are conveyed by tubes 26 and 28 to respective opposite sides of a differential pressure sensing means shown as comprising diaphragm assembly 42. As flow rate (leftwardly in conduit 32 in FIG. 1) increases, the increasing pressure difference on opposite sides of diaphragm 42 urges diaphragm 42 and rod 40 leftwardly as viewed in FIG. 1, with an increasing force, which may be designated $F_1$. Diaphragm assembly 42 may be seen to comprise a pressure-to-force transducer, which converts the differential pressure signal into a measured force applied to translate rod 40. Rod 40, which is rigidly attached to the center of diaphragm 42, is supported in bearings 44, 44 and journalled to pass through the walls of assembly 24.

As force $F_1$ begins to move displacement-to-electrical signal transducer from a zero or balanced position, an electrical unbalance signal $E_1$ will be derived, which signal will tend to increase with any increase in displacement. As soon as transducer 22 begins to move sufficiently to provide such an unbalance signal, the signal is amplified and used to operate force motor 20 in a direction tending to decrease or minimize the displacement which caused the unbalance signal. The action of transducer 22, amplifier 50 and force motor 20 are substantially instantaneous so that during normal operation rod 40 never translates more than a few thousandths of an inch. Force motor 20 is shown in FIG. 1 as comprising an electromagnet having a winding 48 and an armature 38. In order to detect very small displacements of rod 40, transducer 22 must be very sensitive. Although a variety of different force or displacement transducers may be used for element 22, an improved, particularly suitable displacement-to-electrical signal transducer is the push-pull photoelectric type shown in detail in FIGS. 4–6.

In a steady-state condition, the rebalancing force $F_2$ applied to rod 40 by force motor 20 must be equal to the $F_1$ force applied to rod 40 by diaphragm 42, in order that rod 42 not move. Because the rebalancing force $F_2$ will vary not linearly, but in accordance with the square of the current applied to force motor 20, upon balance of forces the output signal $E_2$ from amplifier 50 will vary not in accordance with dp, the applied differential pressure, but in accordance with the square root of dp. Therefore, the output signal of amplifier 50 will be directly proportional to flow rate, and it may be used to operate various recording, indicating, controlling and computing devices. Nonlinearities in the operation of transducer 22 and amplifier 50 do not appreciably affect instrument accuracy so long as the system loop gain is maintained above a given level. It is important that transducer 22 be sensitive to very small motions and capable of operating roughly proportionally for small motions. Because the gain of amplifier 50 easily may be made fairly high, only an extremely small, practically negligible displacement of transducer 22 will be required in order to provide a large rebalancing force from force motor 20. As will be explained in greater detail, negligible displacement of the armature 38 of force motor 20 is a pre-requisite to motor force $F_2$ being an accurate square function of motor current, and the overall accuracy of the instrument depends upon the square function relationship being exact. Stated more precisely, in order for the force applied to armature 38 to be truly proportional to the square of the current in coil 48, the reluctance of the magnetic circuit must be contributed substantially by the air gap between the magnet core and the armature, and secondly, the length and reluctance of the gap must not change appreciably. Because transducer 22 is sufficiently sensitive, and because high system loop gain is provided, rod 40 and armature 38 never translate sufficiently to adversely affect the length of the magnetic circuit air gap.

It may be noted that force motor 20 is inherently a uni-directional motor, capable only of attracting and not repelling armature 38, which is not polarized. Therefore, force motor 20 never can repel armature 38, and by crossing the origin of a Nyquist diagram, drive the system to its leftward limit. Because of this unidirectional characteristic, the sometimes dangerous uncontrolled operation often characteristic of square root devices under small signal conditions does not occur with the present invention. Means shown diagrammatically as dash-pot 33 comprise viscous damping means necessary to prevent the system from oscilalting and overshooting. In actual embodiments of the invention oil or air dashpots, or eddy current dampers or other known viscous damping means may be connected to the movable element 40. It is important that the damping be proportional to movable element velocity, and hence viscous friction-type damping means should be used only if they do not contribute substantial static friction.

The foregoing description of the schematic arrangement gives an overall understanding of the system arrangement of the invention, and serves to identify the major components, and the inter-relationship thereof. A more thorough understanding of the detailed structure of preferred types of force motor and motion transducer may be had by reference to FIGS. 3–5. As seen in FIG. 3, the pipes 26 and 28 connect to opposite sides of differential pressure sensing means 53 shown in the form of a diaphragm chamber 54 having a diaphragm 56 arranged therein. A rod or shaft 58 rigidly affixed to the diaphragm extends through a force motor assembly 60 which includes electromagnet core 70 and armature 62. The electromagnet core 70 is secured to wall member 64, and includes a stationary winding 66 arranged upon E-shaped iron core 70 having a central leg 68 through which rod 58 passes. The force motor core and armature preferably comprise conventional low-hysteresis magnetic core material. Translatable rod 58 rigidly interconnects diaphragm 56 and armature 62, being shown threaded into the latter. A pressure seal means 72 of known type is positioned to allow axial movement of the shaft 58, while sealing a half of the diaphragm chamber 54. An exemplary sealing means eminently suitable for use herein is the arrangement shown in my prior copending Appl. Serial No. 31,475 filed May 24, 1960. As will now be evident, the force $F_1$ of diaphragm 56 resulting from differential pressure in diaphragm assembly 53 urges rod 58 leftwardly, against the force $F_2$ with which electromagnet 61 attracts armature 62; and the displacement-sensing transducer mechanically connected to the lower end of armature 62 senses any displacement S of rod 58, and converts the displacement S into an electrical signal $E_1$. Viscous damping means (not shown) may be mechanically connected to movable armature 62, for the purpose mentioned above in connection with FIG. 1.

The improved motion transducer, shown in FIG. 3 as supported by wall 64, includes a light grating means comprising a pair of flat transparent plates 74, 76, each of which has a plurality of parallel opaque lines 78, 80 respectively, which are offset one-half line width when the plates are in normal, or center position, as best seen in FIG. 6. A centrally disposed line 81, on lower plate 74, is double the width of lines 78 and 80. Lower plate 74 is held stationary by connection to the wall 64, while upper plate 76 is coupled to the lower end of armature 62 for movement therewith, and hence movement relative to lower plate 74. The lines on the two plates are parallel to each other. The opaque lines 78, 80, are located so that movement of plate 76 toward the left FIG. 6), will move opaque lines 80 into closer registration with the opaque lines 78, on the left portion of the plates, and will move the lines 80 away from registration with the lines 78 on the right portion of the plates. Movement of the plate 76 toward the right will reverse such registration. With a light source 82 positioned on one side of plate 74, as seen in FIG. 3, movement of plate 76 toward the left will progressively allow more light to pass through the left portion of the plates and simultaneously reduce passage of light through the left portion of the plates, and allow more light to pass through the right portion of the plates. When the plates are in a relatively normal position (FIG. 6), the light intensity as viewed from the side plate 76, i.e., after light has passed through the plates, will be equal on both the right and left portions. Thus it will be seen that movable plate 76 operates much like a doubly-acting shutter, so that a given motion in one single direction not only opens or increases light passage through one area but closes off and decreases light passage through another area. This push-pull arrangement allows the invention to operate two photo-detectors, decreasing the light passed to one photo-detector while simultaneously increasing the light passed to a second photo-detector. The fact that the shutter portions comprise parallel lines extending perpendicular to the direction of relative travel of the shutters enables the shutters to provide a maximum change in light flux for a very small motion. As will be shown below, the use of plural photo-detectors enables the system to be made less subject to line voltage variations. Because of the push-pull arrangement, very small motions result in a considerable change in light passed to the photo-detectors, allowing provision of a displacement-to-electrical signal transducer of considerable sensitivity and good linearity in a small space. It also should be noted that movable plate 76 need not be journalled or otherwise placed in frictional contact with any stationary element, and positioning movable shutter plate 76 does not require the compression or extension of any spring means, so it will be apparent that operation of the displacement transducer does not apply any force to force-balance rod 58 or otherwise mechanically load the instrument. The push-pull action of the motion transducer arrangement shown provides a great change in the two light paths modulated by the shutters for a small motion. In any closed loop system of the type shown, wherein high loop gain is required for good accuracy, linearity and frequency response, it is highly advantageous to provide the highest gain by means of elements having minimum drift. Because the motion transducer may be made so sensitive, the gain in the electronic amplifier may be decreased while still providing sufficient overall loop gain, and decrease in the gain of the amplifier, which is subject to drift, decreases proportionally the tendency of the overall system to drift.

A linkage system shown inter-connecting plate 76 and armature 62 includes a rod 84 having adjustable means, such as a turnbuckle 86, for adjusting the length thereof. In such manner gap 87 between movable armature 62 and the stationary magnet body 70 may be adjusted to vary the force factor of the force motor 60. As will be apparent, with no input pressure applied to rod 58, adjustment of the length of rod 84 can be made to position mask 76 so that no error voltage is applied to amplifier 50. Mechanical stops (not shown) may be provided, if desired, to prevent system overtravel beyond about one line width of the motion transducer, so that the motion detector does not move so far as to attempt to balance at an extreme displacement.

Arranged adjacent movable shutter plate 76 and parallel thereto, is a pair of photo-detectors shown as comprising photo-conductive cells 88, 90 of the cadmium-sulfide, head-on type. The cells receive light passing through plates 74 and 76, and because their resistances depend upon the amount of light imposed on them, they provide an error voltage signal commensurate with displacement of movable shutter 76 relative to stationary mask 74. As shown in detail in FIG. 7, current flows from the positive terminal 109 of power supply 92 via conductor 105 through photodetector 90, past terminal 111, and then through photodetector 88 to the negative terminal 107 of a regulated power source. The photodetectors will be seen to comprise two legs of a bridge circuit. The power supply voltage between terminals 119 and 109 of rectifier 92 is applied across the photodetectors in series with resistance R–1, and Zener diode 98 controls the supply voltage applied across the photodetectors. As the resistance of photo-detector 90 increases, and/or as the resistance of photodetector 88 decreases, terminal 111 will swing in a negative direction. Conversely, as the resistance of photo-detector 90 decreases, and/or the resistance of photo-detector 88 increases, terminal 111 will become more positive. It may be noted that line voltage variations, which result in supply voltage variation across the photo-detectors will equally affect the voltage drop across each photoresistance, thereby not unbalancing the bridge circuit arrangement shown. The voltage signal between terminal 111 and supply terminal 109 is applied to a two-stage conventional grounded emitter transistor amplifier comprising transistors 94 and 96, each of which acts as a voltage amplifier and buffer. A variety of known equivalent amplifiers may be substituted without departing from the invention. The output signal from the collector electrode of transistor 96 is connected directly through coil 66 of the electromagnet force motor, and returned to the negative supply terminal via thermistor 100 and rheostat R–11. The output signal is also present at output terminal 117. Thermistor 100 varies with temperature and tends to maintain the output circuit load impedance constant as coil 66 resistance varies due to temperature. The adjustment of rheostat R–11 serves as a "fine" range adjustment.

Although cadmium sulfide photo-resistances are shown above, the invention may utilize a variety of other known photo-detectors, including photo-voltaic cells as well as photo-conductive or photo-resistive cells, and in each embodiment a pair of cells may be connected in bridge fashion to operate with the push-pull shutter arrangement shown.

As will be seen from the circuit diagram of FIG. 7, an increase in differential pressure will result in movement of the plate 76 so that light intensity increases on photo-cell 90, and decreases on photo-cell 88. This results in an increase of current in the coil 66, which produces an increase in magnetic force, causing greater attraction for the armature 62. A decrease in differential pressure will result in movement of the plate 76 so that light intensity decreases on photo-cell 90, and increases on photo-cell 88, thus reducing current flow in the coil 66, and a reduction of magnetic force on the armature 62. As explained above, the electromagnet current and applied voltage constitute a transducer output signal proportional to the square root of the differential pressure input signal.

Figure 8:
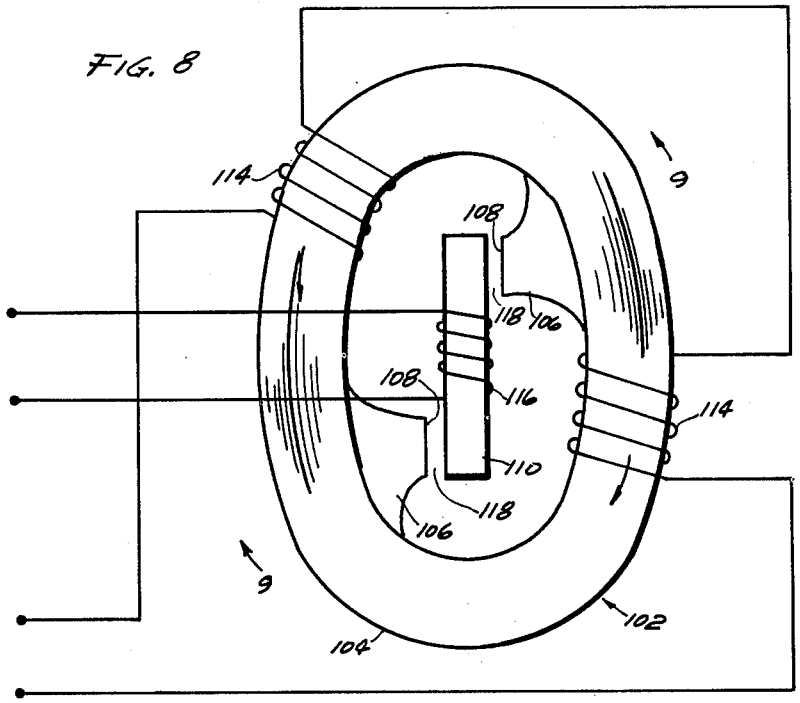
FIG. 8 shows a modified form of force motor.
Figure 9:
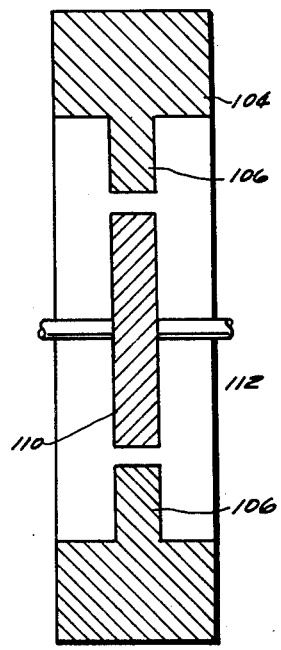
FIG. 9 is a section view generally as seen along line 9—9 in FIG. 8.

A modified force motor 102 shown in FIGS. 8 and 9, includes a generally elliptical iron body member 104 having two inwardly extending portions 106, with parallel flat and faces 108, an armature 110 supported for rotary motion upon a shaft 112, and fixed coils 114 in series on the body member 104, and a coil 116 on the armature 110. The force motor 102 may be preferred in applications where the pressure differential signal input is taken from a rotary means, rather than from an axially moving means, such as the shaft 58 in the above described embodiment. Thus the invention contemplates instruments wherein an input torque due to differential pressure or a like quantity is balanced against a rebalancing torque from a rotary torque motor, as well as the translatory embodiment shown in FIG. 3. In rotary embodiments as well as translatory embodiments it is highly desirable that no gearing or other backlash-producing elements be interposed between the forces or torques being balanced.

Figure 2:
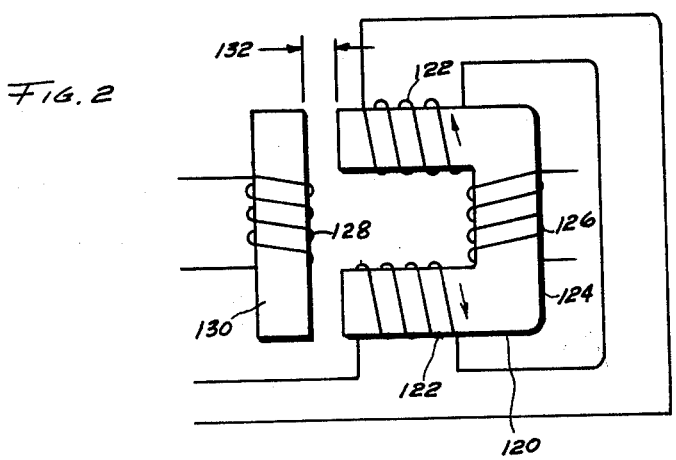
FIG. 2 is a view of a modified type of force motor usable in the arrangement of FIG. 1.

In FIG. 2, a modified force motor 120 is shown, wherein a pair of windings 122, in series, is arranged upon the arms of a U-shaped iron body member 124. An additional coil 126 may be arranged upon the member 124, while another coil 128 may be fixed upon an armature 130.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

Apparatus for producing a direct voltage output signal proportional with the rate of flow of fluid past an orifice in a first conduit comprising, a differential pressure-to-force transducer including a diaphragm and a movable rod element connected to said diaphragm;

a pair of second conduits, each respectively directly connected to said first conduit on opposite sides of said orifice and to said differential pressure-to-force transducer on opposite sides of said diaphragm;

a photo electric displacement-to-electrical signal transducer including a movable mask, a fixed mask, a light source and first and second photo-detectors, each of said masks having alternate apertures and opaque portions on opposite sides of the center of said mask;

means securing said movable mask to said movable rod element, thereby defining a first plane;

means rigidly positioning said fixed mask in a second plane substantially parallel to, but spaced apart from, said movable mask defining said first plane;

further means positioning said light source on one side of said first and second planes and said first and second photo-detectors on the opposite side of said first and second planes, said first and second photo-detectors being symmetrically positioned about said center of said masks;

circuit means electrically connecting the output of each of said first and second photo-detectors in an electronic balanced bridge arrangement to provide a direct voltage signal in order that a translation of said movable mask increases the quantity of light incident upon said first photo-detector through said masks from said source while simultaneously decreasing the quantity of light incident upon said second photo-detector through said masks from said source as said movable mask is translated in a first direction, thereby decreasing the impedance of one of said photo-detectors and simultaneously increasing the impedance of the other of said photo-detectors so as to modify the magnitude of said direct voltage signal as said movable mask is translated relative to said fixed mask;

an amplifier coupled to said direct voltage signal generated by said balanced bridge arrangement for providing an output signal; and a force motor connected to be operated by said output signal and further connected to apply a rebalancing force to said movable rod element, said force motor comprising an electromagnet having a winding connected to be excited by said output signal and an armature including an element of magnetic material arranged to be attracted by said electromagnet, said armature being mechanically connected to said movable rod element to apply said rebalancing force to said movable rod element and said diaphragm.

References Cited by the Examiner
UNITED STATES PATENTS

| | | | |
|---|---|---|---|
| 2,136,900 | 11/38 | Woolley | 73—205 X |
| 2,319,363 | 5/43 | Wunsch et al. | |

FOREIGN PATENTS

| | | |
|---|---|---|
| 804,373 | 4/51 | Germany. |
| 513,654 | 10/39 | Great Britain. |

RICHARD C. QUEISSER, *Primary Examiner.*

ROBERT L. EVANS, JOSEPH P. STRIZAK, *Examiners.*